(12) United States Patent
Shen (10) Patent No.: US 11,804,089 B2
(45) Date of Patent: Oct. 31, 2023

(54) SERVER DEVICE AND DOOR CONTROL DEVICE

(71) Applicant: PACPORT CO., LTD., Tokyo (JP)

(72) Inventor: Ye Shen, Tokyo (JP)

(73) Assignee: PACPORT CO., LTD., Tokyo (JP)

( * ) Notice: Subject to any disclaimer, the term of this patent is extended or adjusted under 35 U.S.C. 154(b) by 0 days.

(21) Appl. No.: 17/767,162

(22) PCT Filed: Dec. 2, 2020

(86) PCT No.: PCT/JP2020/044940
§ 371 (c)(1),
(2) Date: Apr. 7, 2022

(87) PCT Pub. No.: WO2021/112149
PCT Pub. Date: Jun. 10, 2021

(65) Prior Publication Data
US 2022/0392287 A1 Dec. 8, 2022

(30) Foreign Application Priority Data
Dec. 2, 2019 (JP) .................................. 2019-218190

(51) Int. Cl.
*G07C 9/32* (2020.01)
*G07C 9/00* (2020.01)

(52) U.S. Cl.
CPC ..... *G07C 9/00904* (2013.01); *G07C 9/00309* (2013.01); *G07C 9/32* (2020.01)

(58) Field of Classification Search
None
See application file for complete search history.

(56) References Cited

U.S. PATENT DOCUMENTS

| 7,183,894 | B2 * | 2/2007 | Yui | G07C 9/00571 |
| | | | | 340/5.7 |
| 9,538,380 | B2 * | 1/2017 | Shen | H04W 12/04 |

(Continued)

FOREIGN PATENT DOCUMENTS

| JP | 2009-215797 A | 9/2009 |
| JP | 6603432 B1 | 11/2019 |

(Continued)

OTHER PUBLICATIONS

International Search Report dated Jan. 12, 2021, in corresponding to International Application No. PCT/JP2020/044940; 3 pages (with English Translation).

(Continued)

*Primary Examiner* — Carlos Garcia
(74) *Attorney, Agent, or Firm* — Maier & Maier, PLLC (57) ABSTRACT

It A service provider such as a courier to unlock a door without a permission of a user. A server device, which is capable of communicating with a door control device that controls locking and unlocking of a door installed at an entrance of a multifamily residential, includes: a storage that stores, for each user, a service number set by a service provider; a request reception that receives, from the door control device, an unlock request including a device ID and the service number; an authentication that executes an authentication based on information included in the unlock request and information stored in the storage; and unlock instructions that transmits an unlock instruction to the door control device, when the authentication is succeeded.

5 Claims, 7 Drawing Sheets

(56) References Cited

U.S. PATENT DOCUMENTS

| | | | |
|---|---|---|---|
| 10,127,750 B2* | 11/2018 | Cordiner | G07C 9/27 |
| 2004/0243812 A1* | 12/2004 | Yui | G07C 9/00563 |
| | | | 713/182 |
| 2016/0360406 A1* | 12/2016 | Shen | H04M 1/72415 |
| 2020/0286006 A1* | 9/2020 | Huang | G06V 40/172 |
| 2022/0198847 A1* | 6/2022 | Oh | G07C 9/00182 |
| 2022/0392287 A1* | 12/2022 | Shen | G06Q 50/28 |
| 2023/0135506 A1* | 5/2023 | Oh | G07C 9/00563 |
| | | | 340/5.52 |

FOREIGN PATENT DOCUMENTS

| | | | |
|---|---|---|---|
| JP | 2020-016109 A | 1/2020 | |
| JP | 2020-53047 A | 4/2020 | |
| KR | 10-1931056 B1 | 12/2018 | |

OTHER PUBLICATIONS

Notice of Decision on Opposition dated Oct. 22, 2021, in corresponding Japanese Application No. 2021-700004; 5 pages (with English Translation).

Notice of Reasons for Revocation dated Jun. 30, 2021, in corresponding Japanese Application No. 2021-700004; 32 pages (with English Translation).

Written Opinion dated Jan. 5, 2021, in corresponding Japanese Application No. 2021-700004; 46 pages (with English Translation).

Notice of Reasons for Refusal dated Sep. 7, 2021, in corresponding Japanese Application No. 2020-151662; 12 pages (with English Translation).

* cited by examiner

| DEVICE ID | BOX ID |
|---|---|
| AAA1111 | BOX99999 |
| | BOX11111 |
| | BOX99999 |
| | BOX11111 |
| | BOX32321 |
| | BOX91222 |
| BBB2222 | BOX44444 |
| | BOX55555 |
| | BOX88888 |
| | BOX77777 |
| ⋮ | ⋮ |

| USER ID | BOX ID | TRACKING NUMBER | PHONE NUMBER | BIRTH DATE |
|---------|--------|-----------------|--------------|------------|
| U1 | BOX99999 | 141-000-000 | 090-○○○○-○○○○ | 19811006 |
| U2 | BOX11111 | 131-333-999 | 090-○○○○-○○○○ | 20020308 |
| ⋮ | ⋮ | ⋮ | ⋮ | ⋮ |

SERVER DEVICE AND DOOR CONTROL DEVICE

TECHNICAL FIELD

The present invention relates to a server device and a door control device.

BACKGROUND

Conventionally, there is known a door unlock system that unlocks a locked door by performing a remote control or the like.

In regards to this, Patent Literature 1 discloses an unlock system that unlocks a door without a remote control when unlocking of the door is permitted by a user of a package delivery service.

CITATION LIST

Patent Literature

Patent Literature 1: Japanese Patent No. 6603432

SUMMARY

With the system disclosed in Patent Literature 1, however, it is necessary for the user to permit unlocking of the door in advance at the time of purchasing the product, or the like. Therefore, when receiving a package from a third party, for example, this system cannot be used until the third party informs the user in advance that a package has been shipped out.

The present invention is designed in view of the foregoing circumstances, and it is an object thereof to provide a server device and a door control device capable of allowing a service provider such as a courier to unlock a door without a permission of the user.

In order to overcome the forgoing issue, a server device according to a first aspect of the present invention is a server device capable of communicating with a door control device that controls locking and unlocking of a door installed at an entrance of a multifamily residential. The server device includes: storage means that stores, for each user, a service number set by a service provider; request reception means that receives, from the door control device, an unlock request including a device ID of the door control device and the service number; authentication means that executes an authentication based on information included in the unlock request received by the request reception means and information stored in the storage means; and unlock instruction means that transmits an unlock instruction to the door control device, when the authentication is succeeded.

Furthermore, in the server device according to a second aspect of the present invention, the service number includes a tracking number of a package.

Furthermore, the server device according to a second aspect of the present invention includes notification means that notifies the door control device when the authentication is failed, in which: when there is a notification from the notification means, the request reception means receives, from the door control device, a reunlock request including identification information of the user as a resident of the multifamily residential, the identification information being different from the service number; and the authentication means re-executes the authentication based on the information included in the reunlock request received by the request reception means and the information stored in the storage means.

Furthermore, the server device according to a third aspect of the present invention includes notification means that notifies the door control device when the authentication is failed, in which: when there is a notification from the notification means, the request reception means receives, from the door control device, a reunlock request including identification information of the user as a resident of the multifamily residential, the identification information being different from the service number; and the authentication means re-executes the authentication based on the information included in the reunlock request received by the request reception means and the information stored in the storage means.

Furthermore, in the server device according to a fourth aspect of the present invention, the identification information includes a phone number of the user.

Furthermore, in the server device according to a fifth aspect of the present invention: the server device is capable of communicating with a terminal of the service provider; the notification means makes an inquiry to the terminal about validity of the service number, when the authentication is failed; and when the request reception means receives the reunlock request, the unlock instruction means transmits an unlock instruction to the door control device only when a result of the inquiry indicates as being valid.

Furthermore, a door control device according to a sixth aspect of the present invention is a door control device capable of controlling locking and unlocking a door installed at an entrance of a multifamily residential and capable of communicating with a server device. The door control device includes: acquisition means that acquires a service number set by a service provider; unlock request means that transmits, to the server device, an unlock request including a device ID of the door control device and the service number acquired by the acquisition means; and control means that automatically unlocks the door, when an unlock instruction is received from the server device.

According to the present invention, the service provider such as the courier can unlock the door without a permission of the user.

DETAILED DESCRIPTION

Hereinafter, an embodiment of the present invention (also referred to as "the embodiment" hereinafter) will be described with reference to the accompanying drawings. For promoting easy understanding, same reference signs are applied to the same components and steps in each of the drawings as much as possible to avoid duplicated explanations.

<Overall Configuration>

Figure 1:
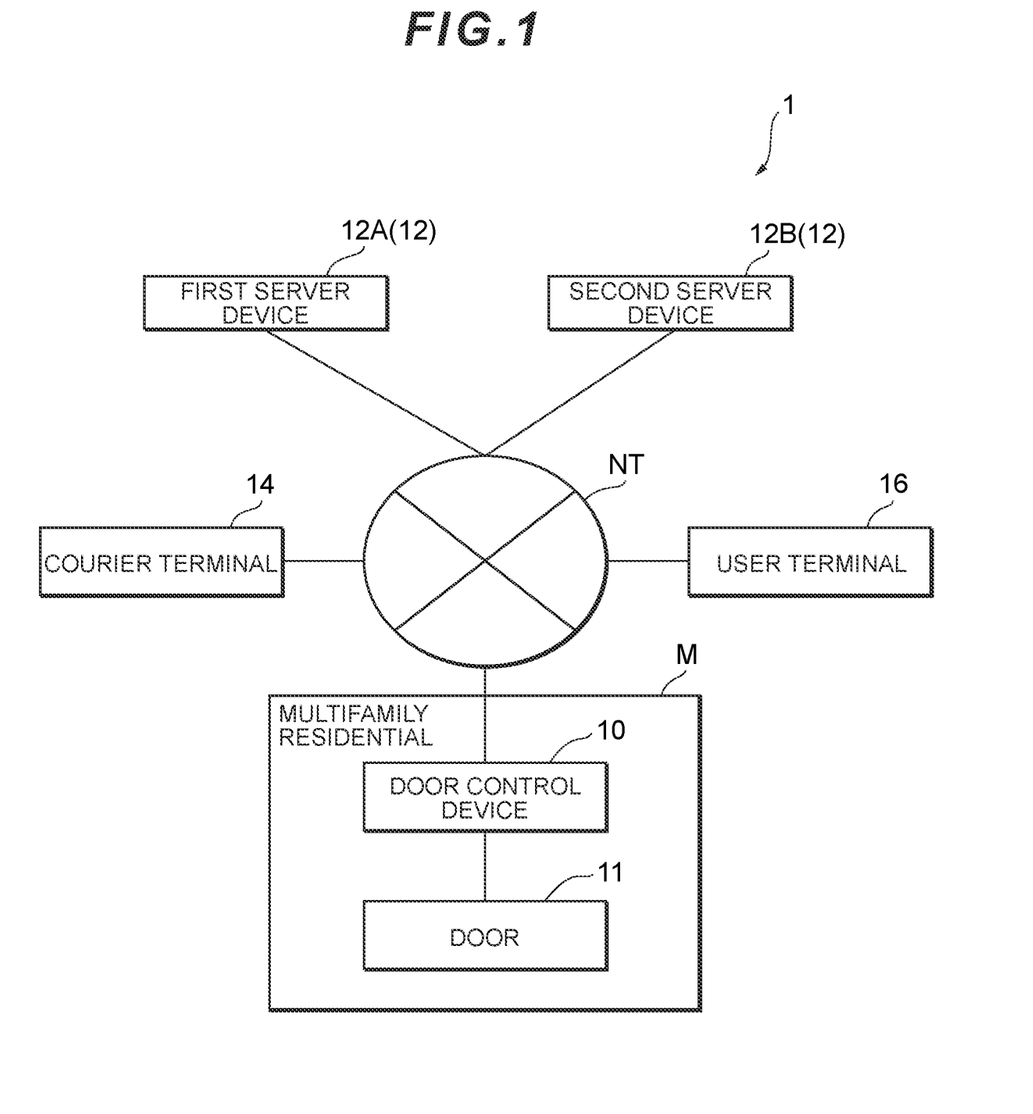
FIG. 1 is a block diagram illustrating an example of an overall configuration of a door unlock system according to an embodiment of the present invention.

FIG. 1 is a block diagram illustrating an example of an overall configuration of a door unlock system 1 according to an embodiment of the present invention.

As illustrated in FIG. 1, the door unlock system 1 includes a single or a plurality of door control devices 10, a server device 12, a courier terminal 14, and a user terminal 16. Those devices are capable of communicating with each other via a communication network NT such as the Internet or a phone line.

The door control device 10 is set near an entrance of a multifamily residential M such as a condominium, an apartment, or a dormitory. The door control device 10 controls locking and unlocking of an autolocking-type door 11 installed at the entrance of the multifamily residential M. For example, the door control device 10 is configured with a pair of intercoms, and one of the intercoms is installed near the entrance of the multifamily residential M while the other intercom is installed at each room of the multifamily residential M. The courier can have a conversation with a resident on the other intercom side by using the pair of intercoms, and can enter the multifamily residential M by having the resident unlock the door 11 by a remote operation. However, when the resident is absent, it is not possible to have a conversation so that the door 11 cannot be unlocked. Therefore, it is not possible to enter the multifamily residential M, so that it is not possible to put a package into a delivery locker or pick up a package from the delivery locker in the multifamily residential M. Thus, the door control device 10 is configured by providing a door control function to the function of the intercoms.

The server device 12 is configured with a first server device 12A and a second server device 12B, for example. The first server device 12A transmits a locking instruction and an unlocking instruction of the door 11 to the door control device 10. The second server device 12B manages the service numbers, and performs an authentication of the courier that is requesting unlocking of the door 11 by using the service numbers.

The courier terminal 14 is a communication terminal device operated by the courier. The courier sets (determines) the service number, particularly a tracking number of the package, at the time of or after receiving the package directed to a user from a third party (sender). Then, the courier informs the set tracking number to the sender. The sender informs the tracking number to the user as the recipient (consignee). The user as the recipient transmits the informed tracking number along with the user ID of the user to the second server device 12B, and the server device 12 stores the received tracking number in association with the received user ID. Examples of the courier terminal 14 may be a cellular phone, a smartphone, a tablet, a laptop computer, a personal computer, and the like.

The user terminal 16 is a communication terminal device operated by the user. Examples of the user terminal 16 may be a cellular phone, a smartphone, a tablet, a laptop computer, a personal computer, and the like. As the user terminal 16 in particular, it is preferable to be a mobile communication terminal device capable of being carried, such as a cellular phone, a smartphone, a tablet, or a laptop computer.

<Hardware Configuration>

Figure 2:
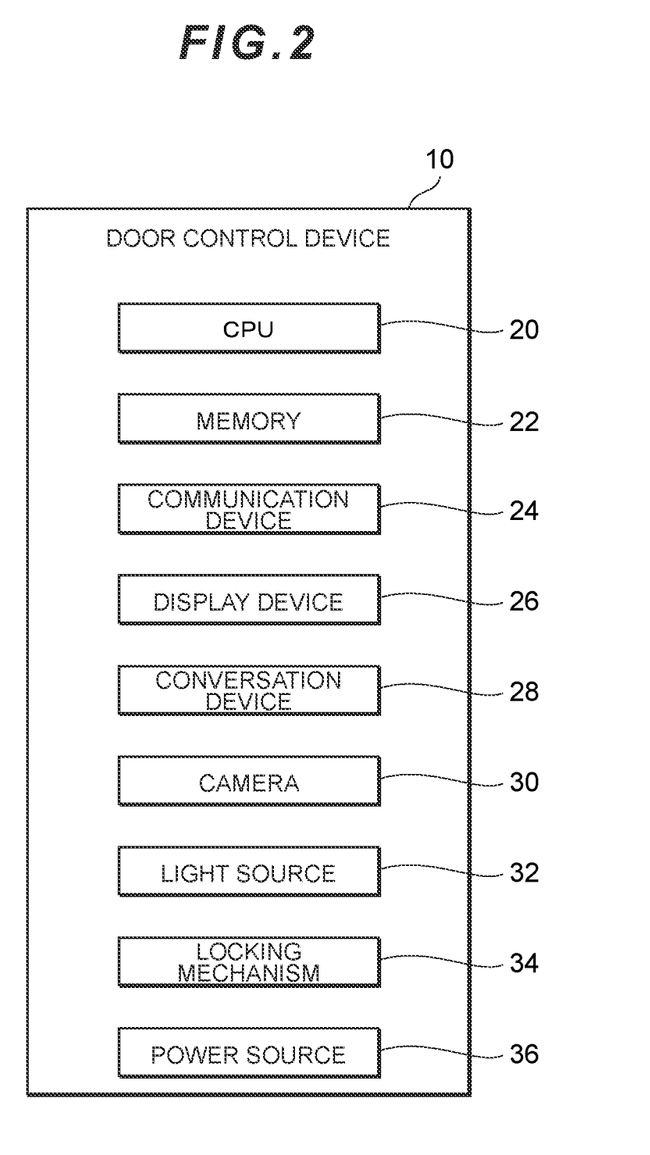
FIG. 2 is a block diagram illustrating an example of a hardware configuration of a door control device illustrated in FIG. 1.

FIG. 2 is a block diagram illustrating an example of a hardware configuration of the door control device 10 illustrated in FIG. 1.

As illustrated in FIG. 2, the door control device 10 includes a CPU (Central Processing Unit) 20, a memory 22, a communication device 24, a display device 26, a conversation device 28, a camera 30, a light source 32, a locking mechanism 34, and a power source 36.

The CPU 20 controls various configurations of the door control device 10, such as the camera 30, the light source 32, and the like, for example.

The memory 22 stores the device ID, the program, and the like of the door control device 10, for example.

The communication device 24 is configured with a communication interface and the like for communicating with outside devices. The communication device 24 transmits/receives various kinds of information or various kinds of data to/from the first server device 12A, for example.

The display device 26 displays the other party while talking.

The conversation device 28 includes an input device, so that the courier can have a conversation with the resident of the room number input by using the input device.

The camera 30 captures an image in the front direction of the door control device 10.

As for the light source 32, emission of light is controlled by the CPU 20. Examples of the light source 32 may be a diode, a lamp, and the like.

The locking mechanism 34 locks and unlocks the door 11.

The power source 36 supplies the power to the CPU 20, the memory 22, and the like. As the power source 36, it is preferable to use a battery, for example.

Figure 3:
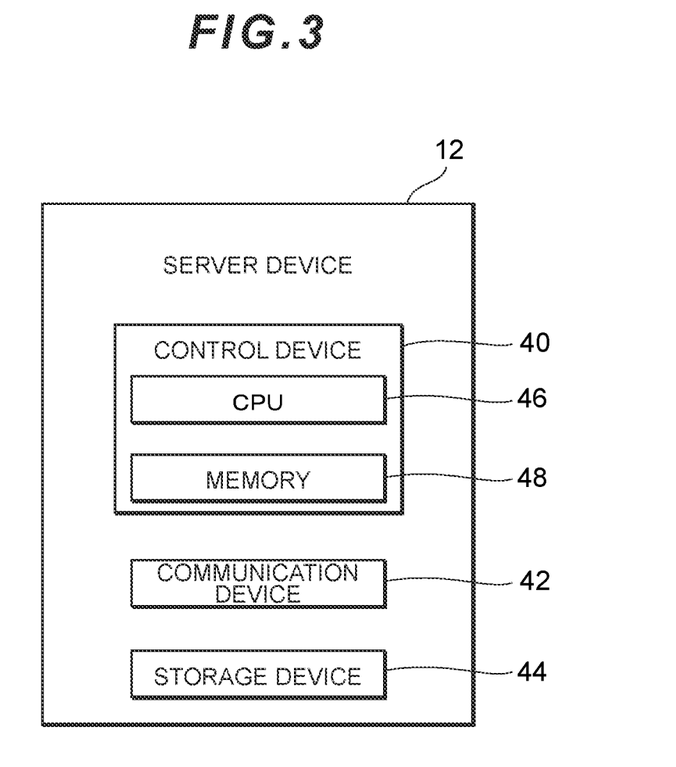
FIG. 3 is a block diagram illustrating an example of a hardware configuration of a server device illustrated in FIG. 1.

FIG. 3 is a block diagram illustrating an example of the hardware configuration of the server device 12 (the first server device 12A and the second server device 12B) illustrated in FIG. 1.

As illustrated in FIG. 3, the server device 12 includes a control device 40, a communication device 42, and a storage device 44. The control device 40 is configured by mainly including a CPU (Central Processing Unit) 46 and a memory 48.

The control device 40 functions as various kinds of functional means by causing the CPU 46 to execute a prescribed program stored in the storage device 44, the memory 48, or the like. The detail of the functional means will be described later.

The communication device 42 is configured with a communication interface and the like for communicating with outside devices. The communication device 42 transmits/receives various kinds of information or various kinds of data to/from the user terminal 16, for example.

The storage device 44 is configured with a hard disk or the like. The storage device 44 stores various kinds of programs as well as various kinds of information necessary for executing processing by the control device 40 and information of the processing result thereof.

Note that the server device 12 can be implemented by using an information processing device such as a dedicated or general-purpose server, computer, or the like. Furthermore, the server device 12 may be configured with a single information processing device or may be configured with a plurality of information processing devices distributed on the communication network NT. It is also to be noted that FIG. 3 simply illustrates a part of the main hardware configuration of the server device 12, and the server device 12 may also include other configurations that are generally provided to a server. Furthermore, the courier terminal 14 and the user terminal 16 can also have the same hardware configuration as that of the server device 12, except that those terminals include operation means and the display device, for example.

<Functional Means>

Figure 4:
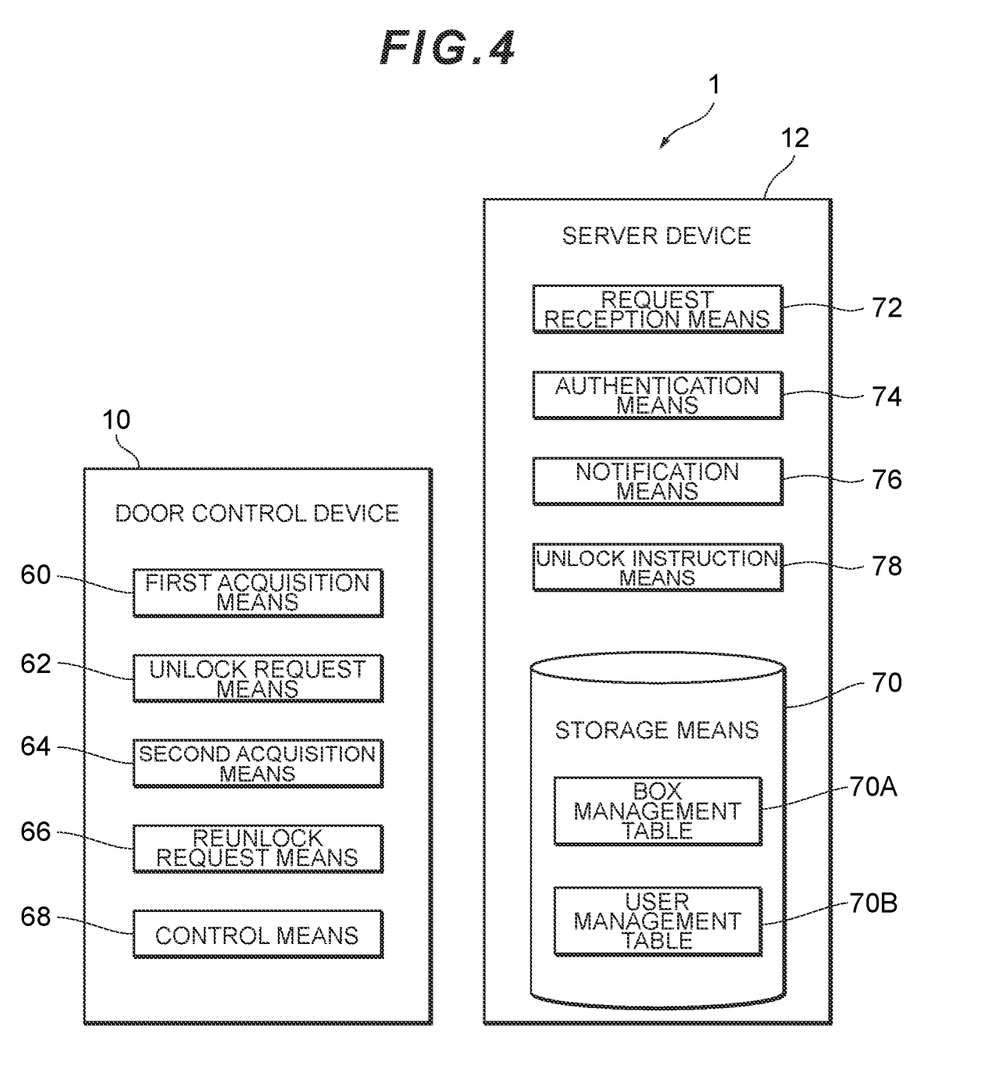
FIG. 4 is a block diagram illustrating an example of functional means of the door unlock system according to the embodiment of the present invention.

FIG. 4 is a block diagram illustrating examples of the functional means of the door unlock system 1 according to the embodiment of the present invention.

As illustrated in FIG. 4, as the functional means, the door control device 10 in the door unlock system 1 includes first acquisition means 60, unlock request means 62, second acquisition means 64, reunlock request means 66, and control means 68. The functional means is implemented when the CPU 20 executes the program stored in the memory 22.

The first acquisition means 60 includes a function of acquiring the service number set by the courier.

The unlock request means 62 has a function of transmitting, to the first server device 12A, an unlock request including the device ID of the door control device 10 and the service number acquired by the first acquisition means 60. Examples of the service number may be a tracking number of the package, the package number, the package code, and the like. The embodiment will be described by referring to a case where the service number is the tracking number.

The second acquisition means 64 has a function of acquiring identification information, from the user, of the user different from the service number when there is a notification from the first server device 12A, such as when there is a notification indicating a failure of a user authentication or when there is a notification requesting additional information for an unlock request, for example. Examples of the identification information may be the phone number of the user, the birth date, the individual number (the number for identifying a specific individual in administrative procedures), name of the user, the user ID, and the like. The embodiment will be described by referring to a case where the identification information is the phone number.

The reunlock request means 66 has a function of transmitting, to the first server device 12A, a reunlock request including the identification information acquired by the second acquisition means 64.

The control means 68 has a function of automatically unlocking the door 11 by controlling the locking mechanism 34, when an unlock instruction is received from the first server device 12A. Furthermore, the control means 68 also has a function of opening and closing the door after unlocking, and locking it.

Furthermore, as the functional means, the server device 12 in the door unlock system 1 includes storage means 70, request reception means 72, authentication means 74, notification means 76, and unlock instruction means 78. The functional means is implemented when the CPU 46 executes the program stored in the storage device 44. While the embodiment is described by referring to a case where the functional means is provided in the second server device 12B, a part of the functional means such as the unlock instruction means 78 and the like may be provided in the first server device 12A.

The storage means 70 has a function of storing, for each user, the service number set by the courier and the identification information of the user different from the service number. Specifically, the storage means 70 stores a box management table 70A and a user management table 70B. In the box management table 70A, the device ID and the box ID, for example, are registered in an associated manner. In the user management table 70B, the box ID, the service number, and the identification information of the user are registered for each user (each user ID). Note that the box management table 70A and the user management table 70B may be integrated as a single table.

Figure 5:
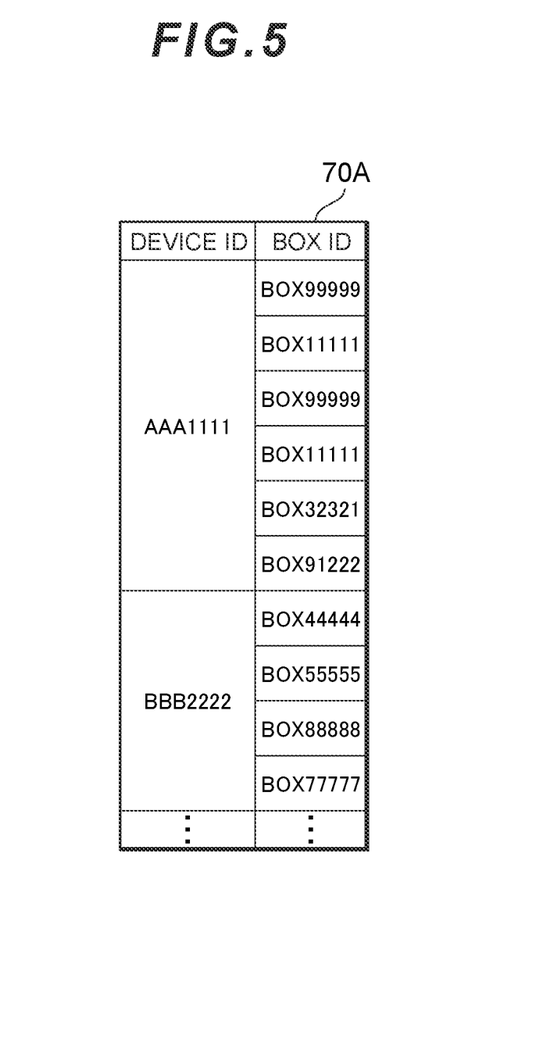
FIG. 5 is a chart illustrating an example of a box management table.

FIG. 5 is a chart illustrating an example of the box management table 70A.

As illustrated in FIG. 5, in the box management table 70A, the device ID of the door control device 10 and the box IDs of a plurality of delivery boxes are registered in an associated manner.

Figure 6:
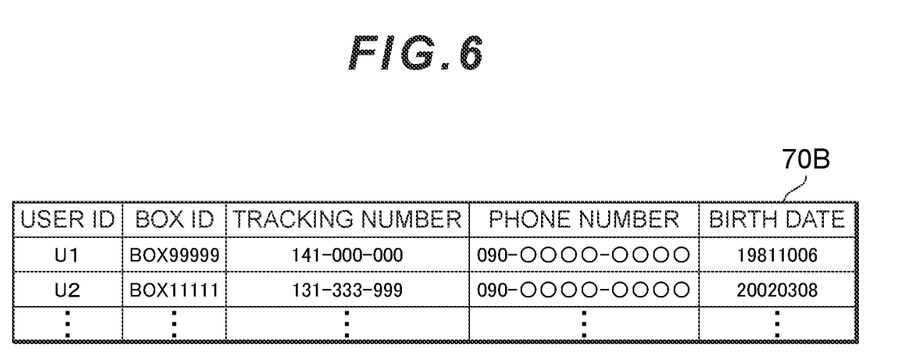
FIG. 6 is a chart illustrating an example of a user management table.

FIG. 6 is a chart illustrating an example of the user management table 70B.

As illustrated in FIG. 6, in the user management table 70B, the box ID, the tracking number as the service number, the phone number as the identification information, and the birth date are registered in an associated manner for each user ID.

Returning to FIG. 4, the request reception means 72 has a function of receiving, from the door control device 10, an unlock request including the device ID of the corresponding door control device 10 and the service number. In the embodiment, the request reception means 72 receives the unlock request from the door control device 10 via the first server device 12A. Furthermore, when there is a notification from the notification means 76 to be described later, the request reception means 72 receives, from the door control device 10, a reunlock request including the identification information different from the service number, which is the identification information (phone number or the like) of the user from which a package is to be picked up or to which a package is to be put in.

The authentication means 74 has a function of executing an authentication based on the information included in the unlock request received by the request reception means 72 and the information stored in the storage means 70. Furthermore, the authentication means 74 re-executes an authentication based on the information included in a reunlock request received by the request reception means 72 and the information stored in the storage means 70.

The notification means 76 has a function of notifying the door control device 10, when an authentication executed by the authentication means 74 is failed. In the embodiment, the notification means 76 notifies the door control device 10 via the first server device 12A.

The unlock instruction means 78 has a function of transmitting an unlock instruction to the door control device 10, when the authentication executed by the authentication means 74 is succeeded. In the embodiment, the unlock instruction means 78 transmits the unlock instruction to the door control device 10 via the first server device 12A.

<Flow of Processing>

Figure 7:
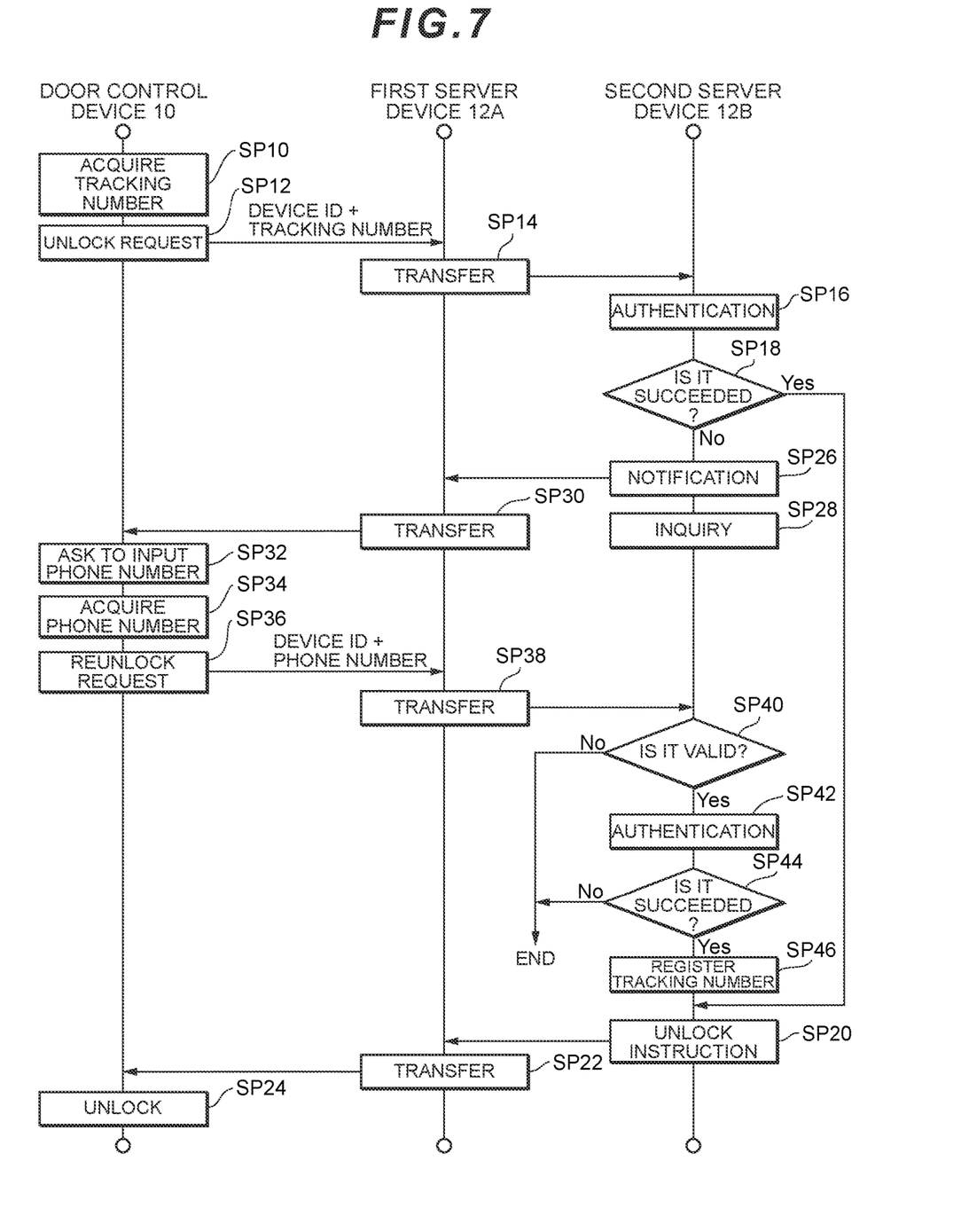
FIG. 7 is a flowchart illustrating an example of a flow of processing performed in the door unlock system according to the embodiment of the present invention, when a courier enters a multifamily residential.

FIG. 7 is a flowchart illustrating an example of a flow of the processing executed by the door unlock system 1 according to the embodiment of the present invention, when the courier enters the multifamily residential M. Note that the content and the order of the following processing may be changed as appropriate.

(Step SP10)

The first acquisition means 60 of the door control device 10 controls the camera 30 to capture a code (two-dimensional code or a three-dimensional code) presented by the courier. Subsequently, the first acquisition means 60 analyzes the captured code to acquire the tracking number. Then, the processing is shifted to processing of step SP12.

(Step SP12)

The unlock request means 62 of the door control device 10 transmits an unlock request including the device ID of the door control device 10 and the tracking number acquired by the first acquisition means 60 to the first server device 12A. Then, the processing is shifted to processing of step SP14.

(Step SP14)

The first server device 12A receives the unlock request from the door control device 10. In response, the first server device 12A transfers the unlock request to the second server device 12B. When the first server device 12A has the box management table 70A stored therein, a plurality of box IDs associated with the device ID included in the unlock request in the box management table 70A may be acquired, and the acquired box IDs may be added to the unlock request. Then, the processing is shifted to processing of step SP16.

(Step SP16)

The request reception means 72 of the second server device 12B receives (accepts) the unlock request from the door control device 10 via the first server device 12A. In response, the authentication means 74 executes a user authentication (authentication of the tracking number) of the courier based on the information included in the unlock request received by the request reception means 72 and the information stored in the storage means 70. Specifically, the authentication means 74 refers to the box management table 70A, and specifies a plurality of box IDs from the device ID included in the unlock request. Subsequently, the authentication means 74 determines whether there is a tracking number matching the tracking number included in the unlock request, among the tracking numbers each being associated with a plurality of specified box IDs in the user management table 70B. Subsequently, the authentication means 74 determines that the user authentication is succeeded when the determination is affirmative, and determines that the user authentication is failed when the determination is negative. When the unlock request includes a plurality of box IDs, the authentication means 74 determines whether there is a tracking number matching the tracking number included in the unlock request, among the tracking numbers each being associated with a plurality of box IDs included in the unlock request in the user management table 70B. Then, the processing is shifted to processing of step SP18.

(Step SP18)

The notification means 76 of the second server device 12B determines whether the user authentication is succeeded. Then, the processing is shifted to processing of step SP20 when the determination is affirmative, and the processing is shifted to processing of step SP26 when the determination is negative.

(Step SP20)

The unlock instruction means 78 of the second server device 12B transmits, to the first server device 12A, an unlock instruction of the door control device 10 requesting the unlock request or the reunlock request to be described later. Then, the processing is shifted to processing of step SP22.

(Step SP22)

The first server device 12A receives the unlock instruction from the second server device 12B. In response, the first server device 12A transmits (transfers) the received unlock instruction to the corresponding door control device 10. Then, the processing is shifted to processing of step SP24.

(Step SP24)

The door control device 10 receives the unlock instruction from the first server device 12A. In response, the control means 68 controls the locking mechanism 34 to automatically unlock the door 11 in a locked state. Thereby, the courier can enter the multifamily residential M from the door 11, and put a package into the delivery box placed in front of each room or pick up a package from the delivery box.

(Step SP26)

When determined as negative in step SP18, the notification means 76 of the second server device 12B notifies an error to the first server device 12A. Then, the processing is shifted to processing of step SP28 and step SP30, respectively.

(Step SP28)

The notification means 76 makes an inquiry to the courier terminal 14 (the server device of the courier) about the validity of the tracking number included in the unlock request via the communication network NT. Specifically, the notification means 76 communicates with the courier terminal 14 to inquire whether the package related to the tracking number is being shipped.

(Step SP30)

The first server device 12A receives the notification from the second server device 12B. In response, the first server device 12A specifies the door control device 10 giving the unlock request, and transfers the received notification to the door control device 10. Then, the processing is shifted to processing of step SP32.

(Step SP32)

The door control device 10 receives the notification from the first server device 12A. In response, the second acquisition means 64 of the door control device 10 requests the courier to input the phone number. As for a requesting method, it may be indicated so on the display device 26 or may be indicated so by a voice through a speaker, not illustrated, for example. In response to the request, the courier operates the door control device 10 to input the phone number of the cellular phone or the landline phone of the resident (user). Then, the processing is shifted to processing of step SP34.

(Step SP34)

The second acquisition means 64 receives the input operation of the courier to acquire the phone number. Then, the processing is shifted to processing of step SP36.

(Step SP36)

The reunlock request means 66 of the door control device 10 transmits the reunlock request including the phone number acquired by the second acquisition means 64 to the first server device 12A. The reunlock request may or may not include the device ID. Then, the processing is shifted to processing of step SP38.

(Step SP38)

The first server device 12A receives the reunlock request from the door control device 10. In response, the first server device 12A transfers the received reunlock request to the second server device 12B. When the first server device 12A has the box management table 70A stored therein, a plurality of box IDs associated with the device ID included in the reunlock request in the box management table 70A may be acquired, and the acquired box IDs may be added to the unlock request. Then, the processing is shifted to processing of step SP40.

(Step SP40)

The request reception means 72 of the second server device 12B receives (accepts) the reunlock request from the first server device 12A. Subsequently, the unlock instruction means 78 determines whether the result of the inquiry in step SP28 indicates that "the tracking number is valid". Specifically, the unlock instruction means 78 determines whether the result of inquiry is "being shipped". Then, when the determination is affirmative, the processing is shifted to processing of step SP42. When the determination is negative, an error is notified to the door control device 10 via the first server device 12A, and a series of processing illustrated in FIG. 7 is ended. Note that this step may be executed after step SP42 and step SP44. That is, when the request reception means 72 receives the reunlock request, the unlock instruction means 78 transmits the unlock instruction to the door control device 10 only when the result of inquiry indicates as being valid.

(Step SP42)

The authentication means 74 of the second server device 12B re-executes a user authentication based on the information included in the reunlock request received by the request reception means 72 and the information stored in the storage means 70. Specifically, the authentication means 74 refers to the box management table 70A, and specifies the user ID from the box ID included in the reunlock request (or the initial unlock request). Subsequently, it is determined whether the phone number associated with the specified user ID in the user management table 70B matches the phone number included in the unlock request. Subsequently, the authentication means 74 determines that the user authentication is succeeded when the determination is affirmative, and the authentication means 74 determines that the user authentication is failed when the determination is negative. Then, the processing is shifted to processing of step SP44.

(Step SP44)

The notification means 76 of the second server device 12B determines whether the user authentication is succeeded or failed. Then, when the determination is affirmative, the processing is shifted to processing of step SP46. When the determination is negative, an error is notified to the door control device 10 via the first server device 12A indicating that the authentication is failed twice, and a series of processing illustrated in FIG. 7 is ended.

(Step SP46)

The authentication means 74 registers the tracking number included in the unlock request to the user management table 70B in association with a specific user ID. Then, the processing is shifted to processing of step SP20.

<Effects>

As described above, in the embodiment, the server device 12 is capable of communicating with the door control device 10 that controls locking and unlocking of the door 11 installed at the entrance of the multifamily residential. Furthermore, the server device 12 includes: the storage means 70 that stores the service number set by the courier for each user; the request reception means 72 that receives, from the door control device 10, the unlock request including the device ID of the door control device 10 and the service number; the authentication means 74 that executes an authentication based on the information included in the unlock request received by the request reception means 72 and the information stored in the storage means 70; and the unlock instruction means 78 that transmits the unlock instruction to the door control device 10 when the authentication is succeeded.

With this configuration, when the courier arrives at the entrance of the multifamily residential and provides the door control device 10 with the service number, an authentication is performed by the server device 12 and the door 11 is unlocked by the door control device 10. As a result, the courier can unlock the door 11 without a permission of the user.

Furthermore, in the embodiment, the service number includes the tracking number of the package.

With this configuration, the courier can unlock the door 11 easily with the tracking number indicated in a two-dimensional code or the like pasted on the package.

Furthermore, the embodiment includes the notification means 76 that notifies the door control device 10 when the authentication is failed. When there is a notification from the notification means 76, the request reception means 72 receives, from the door control device 10, the reunlock request including the identification information different from the service number, which is the identification information of the user from which a package is picked up or to which a package is put in, and the authentication means 74 re-executes an authentication based on the information included in the reunlock request received by the request reception means 72 and the information stored in the storage means 70.

With this configuration, even in a case where the user does not know the service number and the service number is not registered in the server device 12, the courier can unlock the door 11 based on the identification information of the user the courier is supposed to know.

Furthermore, in the embodiment, the identification information includes the phone number of the user.

With this configuration, even in a case where the user does not know the service number and the service number is not registered in the server device 12, the courier can unlock the door 11 by using the phone number since the courier is supposed to know the phone number of the user (the consignee or the like).

Furthermore, in the embodiment, the server device 12 is capable of communicating with the courier terminal 14 of the courier. The notification means 76 makes an inquiry to the courier terminal 14 about the validity of the service number when the authentication is failed. When the reunlock request is received by the request reception means 72, the unlock instruction means 78 transmits the unlock instruction to the door control device 10 only when the result of inquiry indicates as being valid.

With this configuration, it is possible to prevent the door control device 10 from being unlocked by a third party who knows the phone number of the user as the consignee by simply using a random code.

Furthermore, in the embodiment, the door control device 10 controls locking and unlocking of the door 11 installed at the entrance of the multifamily residential, and it is capable of communicating with the server device 12. Moreover, the door control device 10 includes: the first acquisition means 60 that acquires the service number set by the courier; the unlock request means 62 that transmits, to the server device 12, the unlock request including the device ID of the door control device 10 and the service number acquired by the first acquisition means 60; and the control means 68 that automatically unlocks the door when the unlock instruction is received from the server device 12.

With this configuration, when the courier arrives at the entrance of the multifamily residential and provides the door control device 10 with the service number, an authentication is performed by the server device 12 and the door 11 is unlocked by the door control device 10. As a result, the courier can unlock the door 11 without a permission of the user.

Modification Example

Note that the present invention is not limited to the specific examples described above. That is, the above specific examples including optional design change added thereto by those skilled in the art are also included within the scope of the present invention as long as they have the characteristic of the present invention. Furthermore, each of the elements of the aforementioned embodiment and the modification example to be described later can be combined when technically possible, and such combinations are also included within the scope of the present invention without departing from the characteristic of the present invention.

For example, the above embodiment is described by referring to the case where a user authentication using the phone number is executed after executing a user authentication using the service number. However, it is also possible to execute the user authentication using the service number after executing the user authentication using the phone number. Furthermore, an unlock instruction may be issued, when the user authentication using the service number and the user authentication using the phone number are both succeeded.

Furthermore, when the user authentication using the phone number is failed, the request reception means 72 may further receive the identification information different from the phone number, and the authentication means 74 may execute the user authentication using the identification information different from the phone number. In that case, the reliability of being the courier is low (may not be the courier), so that the request reception means 72 may receive two types of identification information (for example, the birth date and the courier ID) different from the phone number, and the authentication means 74 may execute the user authentication based on the two types of identification information received by the request reception means 72 and the information stored in the storage means 70.

Furthermore, when the user authentication using the service number is failed, the second acquisition means 64 of the door control device 10 may have the courier select either one from input of the phone number and input of the identification information of the user other than the phone number.

Furthermore, while the above embodiment is described by referring to the case where the service number is set by the courier, it may also be set by another service provider. Example of another service provider may be a cleaning business company, a beverage handler, a food delivery company, and the like. In that case, examples of the service number may be a customer number and the like. Furthermore, in that case, the courier terminal 14 is simply referred to as a "terminal". Then, the server device 12 is capable of communicating with the terminal (server device) of the service provider, and the notification means makes an inquiry to the terminal about the validity of the service number, when the authentication is failed. Furthermore, while the identification information of the user is described by referring to the case of the identification information of the user from which a package is picked up or a package is put in, the identification information may simply need to be the identification information of the resident of the multifamily residential M.

10: Door control device
12: Server device
60: First acquisition means
62: Unlock request means
70: Storage means
72: Request reception means
74: Authentication means
78: Unlock instruction means FIG. 1
  12A(12) FIRST SERVER DEVICE
  12B(12) SECOND SERVER DEVICE
  14 COURIER TERMINAL
  16 USER TERMINAL
  M MULTIFAMILY RESIDENTIAL
  10 DOOR CONTROL DEVICE
  11 DOOR FIG. 2
  10 DOOR CONTROL DEVICE
  22 MEMORY
  24 COMMUNICATION DEVICE
  26 DISPLAY DEVICE
  28 CONVERSATION DEVICE
  30 CAMERA
  32 LIGHT SOURCE
  34 LOCKING MECHANISM
  36 POWER SOURCE FIG. 3
  12 SERVER DEVICE
  40 CONTROL DEVICE
  48 MEMORY
  42 COMMUNICATION DEVICE
  44 STORAGE DEVICE FIG. 4
  10 DOOR CONTROL DEVICE
  60 FIRST ACQUISITION MEANS
  62 UNLOCK REQUEST MEANS
  64 SECOND ACQUISITION MEANS
  66 REUNLOCK REQUEST MEANS
  68 CONTROL MEANS
  12 SERVER DEVICE
  72 REQUEST RECEPTION MEANS
  74 AUTHENTICATION MEANS
  76 NOTIFICATION MEANS
  78 UNLOCK INSTRUCTION MEANS
  70 STORAGE MEANS
  70A BOX MANAGEMENT TABLE
  70B USER MANAGEMENT TABLE FIG. 5
  #1 DEVICE ID
  #2 BOX ID FIG. 6
  #1 USER ID
  #2 BOX ID
  #3 TRACKING NUMBER
  #4 PHONE NUMBER
  #5 BIRTH DATE FIG. 7
  10 DOOR CONTROL DEVICE
  12A FIRST SERVER DEVICE
  12B SECOND SERVER DEVICE
  SP10 ACQUIRE TRACKING NUMBER
  SP12 UNLOCK REQUEST
  #1 DEVICE ID+TRACKING NUMBER
  SP14 TRANSFER
  SP16 AUTHENTICATION
  SP18 IS IT SUCCEEDED?
  SP26 NOTIFICATION
  SP28 INQUIRY
  SP30 TRANSFER
  SP32 ASK TO INPUT PHONE NUMBER
  SP34 ACQUIRE PHONE NUMBER
  SP36 REUNLOCK REQUEST
  #2 DEVICE ID+PHONE NUMBER SP38 TRANSFER
SP40 IS IT VALID?
SP42 AUTHENTICATION
SP44 IS IT SUCCEEDED?
SP46 REGISTER TRACKING NUMBER
SP20 UNLOCK INSTRUCTION
SP22 TRANSFER
SP24 UNLOCK
3 END

The invention claimed is:

1. A server device capable of communicating with a door control device that controls locking and unlocking a door installed at an entrance of a multifamily residential, the server device comprising:
   a non-transitory computer-readable storage medium that stores, for each user, a service number set by a service provider;
   a request reception unit that receives, from the door control device, an unlock request including a device ID of the door control device and the service number;
   an authentication unit that executes an authentication based on information included in the unlock request received by the request reception unit and information stored in the non-transitory computer-readable storage medium;
   an unlock instruction unit that transmits an unlock instruction to the door control device, when the authentication is succeeded; and
   a notification unit that notifies the door control device when the authentication is failed, wherein:
   when there is a notification from the notification unit, the request reception unit receives, from the door control device, a reunlock request including identification information of the user as a resident of the multifamily residential, the identification information being different from the service number; and
   the authentication unit re-executes the authentication based on the information included in the reunlock request received by the request reception unit and the information stored in the non-transitory computer-readable storage medium.

2. The server device according to claim 1, wherein the service number includes a tracking number of a package.

3. The server device according to claim 1, wherein the identification information includes a phone number of the user.

4. The server device according to claim 1, wherein:
   the server device is capable of communicating with a terminal of the service provider;
   the notification unit makes an inquiry to the terminal about validity of the service number, when the authentication is failed; and
   when the request reception unit receives the reunlock request, the unlock instruction unit transmits an unlock instruction to the door control device only when a result of the inquiry indicates as being valid.

5. A door control device capable of controlling locking and unlocking a door installed at an entrance of a multifamily residential and capable of communicating with a server device, the door control device comprising:
   an acquisition unit that acquires a service number set by a service provider;
   an unlock request unit that transmits, to the server device, an unlock request including a device ID of the door control device and the service number acquired by the acquisition unit; and
   a control unit that automatically unlocks the door, when an unlock instruction is received from the server device; and
   a notification unit that notifies the door control device when the authentication is failed, wherein:
   when there is a notification from the notification unit, the request reception unit receives, from the door control device, a reunlock request including identification information of the user as a resident of the multifamily residential, the identification information being different from the service number; and
   the authentication unit re-executes the authentication based on the information included in the reunlock request received by the request reception unit and the information stored in the non-transitory computer-readable storage medium.

* * * * *